UNITED STATES PATENT OFFICE.

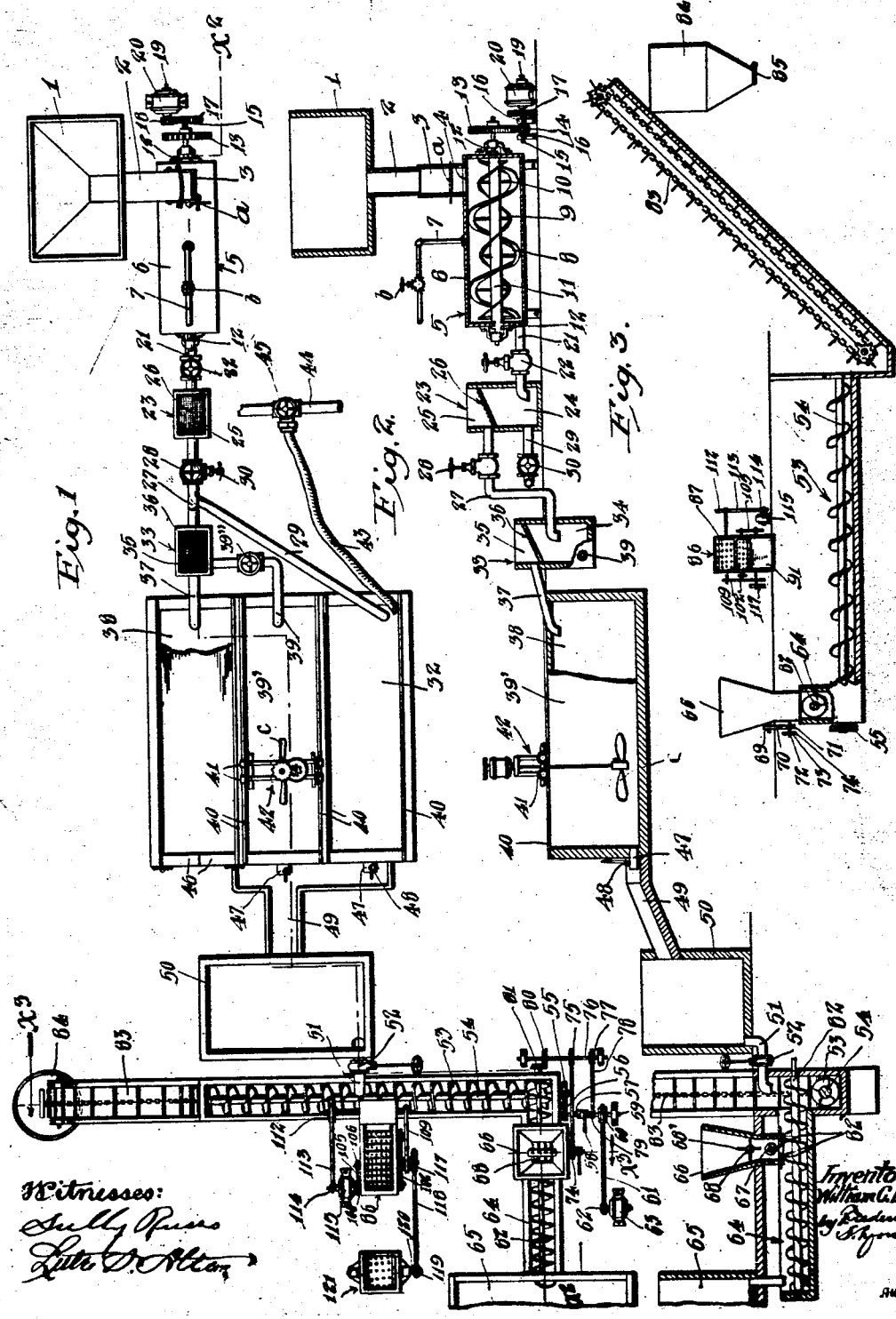

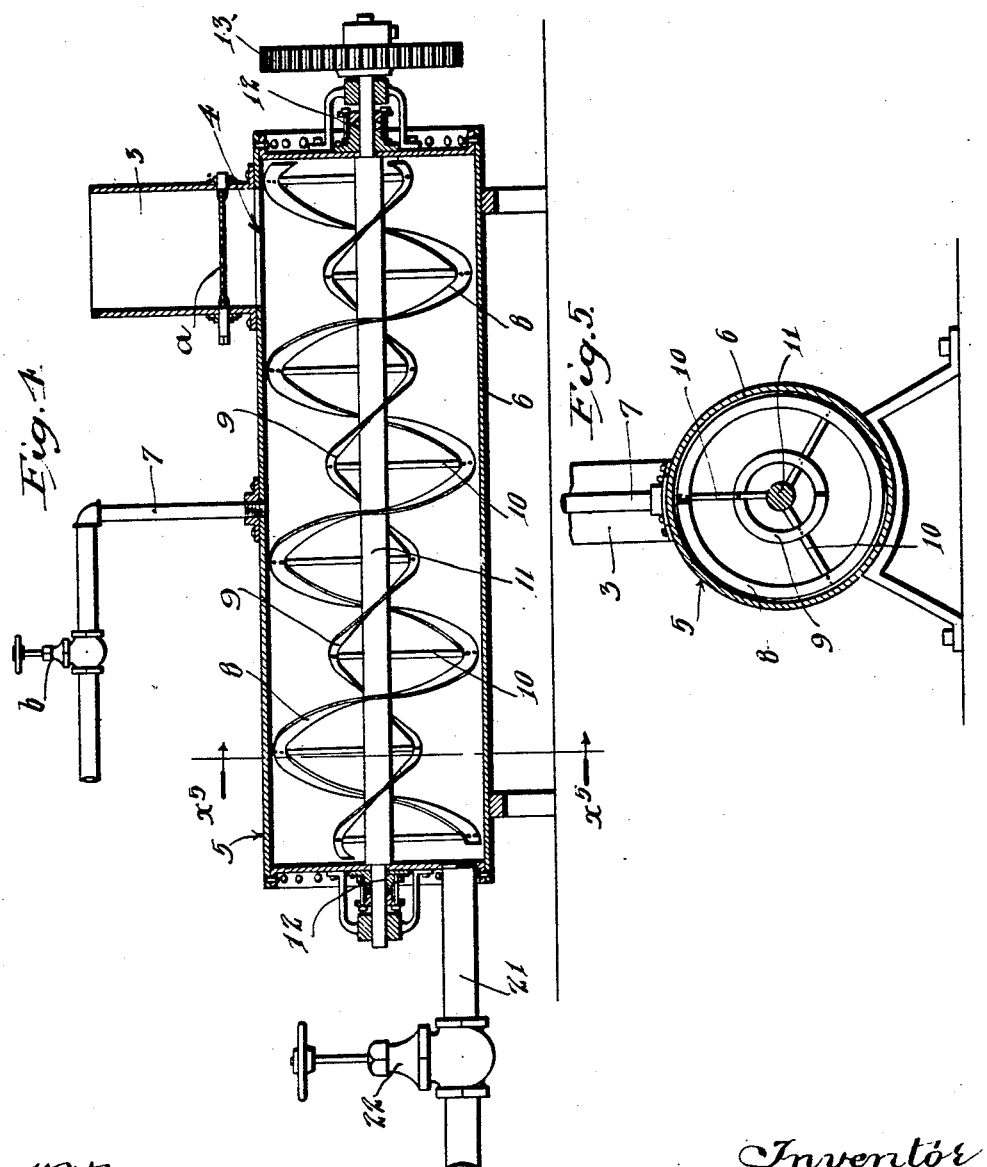

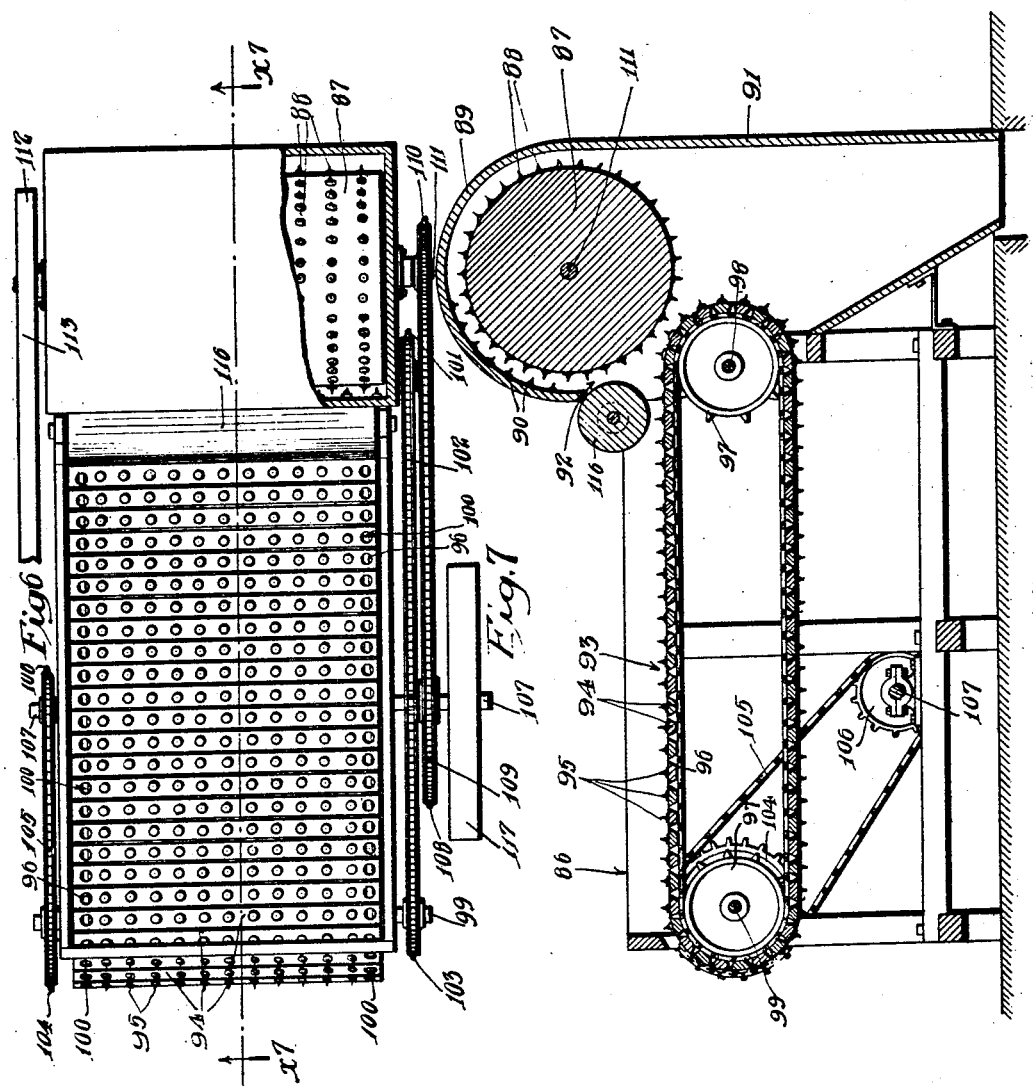

WILLIAM C. HAY, OF LOS ANGELES, CALIFORNIA.

PROCESS OF MAKING PLASTER AND MORTAR.

1,241,211.  Specification of Letters Patent.  Patented Sept. 25, 1917.

Application filed October 19, 1916. Serial No. 126,513.

*To all whom it may concern:*

Be it known that I, WILLIAM C. HAY, a subject of the King of Great Britain, having declared my intention of becoming a citizen of the United States, residing at Los Angeles, in the county of Los Angeles and State of California, have invented a new and useful Process of Making Plaster and Mortar, of which the following is a specification.

This invention relates to the making of plaster and mortar having a lime base, and one object of the invention is to produce a superior product.

Another object is the production of plaster and mortar by a process which facilitates initial hardening thereof.

Another object is to make plaster and mortar by a process which will produce uniformity in composition of any given quantity of the product.

An object of this invention is to improve the quality of lime mortar used for grouting and for plaster.

Another object is to improve the quality of plaster composed of lime mortar and fibrous material such as hair or rope.

Another object is to produce lime mortar by a process that effects a great saving in the quantity of lime used.

I have discovered in making lime mortar that, if aged lime putty be violently beaten, agitated, churned or whipped in the manner that cream and eggs are whipped and beaten to smooth and lighten them, the quantity of lime required for each cubic yard of sand is approximately one-fourth less than is required when the aged lime putty is not so whipped and beaten. From this it follows that each cubic yard of mortar made by my process contains approximately one-fourth less water than mortars otherwise made and consequently the mortar produced by my process will dry out in much less time than those mortars otherwise made.

I apprehend that the violent beating, agitation, churning or whipping of the aged lime putty aerates said putty in the same way that whipping and beating of cream and eggs aerates them, and I apprehend that the analogy holds good as to the smoothing and lightening and bulk-increasing effects of the whipping and beating. However that may be, each cubic yard of first coat plaster mortar produced by processes heretofore in vogue requires approximately four-hundred pounds of commercial lime and one cubic yard of sand, whereas each cubic yard of first coat plaster mortar produced by this improved process requires but approximately three-hundred pounds of commercial lime and one cubic yard of sand, thus effecting a saving of one-hundred pounds of lime for each cubic yard of mortar.

In making plaster mortar by this improved process the aged putty is stirred and beaten and fibrous material is fed in a continuous sheet at a predetermined rate of speed and as the sheet advances the fibers or strands of hair are picked from one edge of the moving sheet into the mixture of sand and cold aged putty while said putty is being stirred and beaten so that the number of pounds of hair per cubic yard of finished plaster mortar can be regulated to a nicety and so that the hair will be uniformly distributed through the finished product and will not produce lumps therein.

Other objects and advantages will appear in the subjoined detail description.

The accompanying drawings illustrate an apparatus designed to perform the various operations or steps of the invention.

Figure 1 is a plan view of the apparatus.

Fig. 2 is a sectional elevation mainly on irregular line indicated by $x^2$—$x^2$, Fig. 1.

Fig. 3 is an elevation mainly in section on line indicated by $x^3$—$x^3$, Fig. 1.

Fig. 4 is an enlarged vertical mid section of the slaker in Figs. 1 and 2.

Fig. 5 is a transverse section on line indicated by $x^5$—$x^5$, Fig. 4.

Fig. 6 is an enlarged plan view of the fiber fluffer, a portion of the cylinder case being broken away for clearance of illustration.

Fig. 7 is a sectional elevation on line indicated by $x^7$—$x^7$, Fig. 6.

In the making of plaster and mortar having a lime base, in order that said plaster and mortar may be able to compete in price with plaster and mortar having a gypsum base, it is necessary to handle the product expeditiously with but few workmen and preferably the process will be a continuous process, that is, the lime will be slaked and then flowed into a curing vat or vats where it is aged, thus producing lime putty, and then the aged lime putty will be suitably thinned, beaten, agitated, whipped and aerated to reduce it to a suitable consistency for flowing. The putty thus beaten, aerated and agitated will then be drawn off from the vat or vats into a measuring tank. Measured quantities of the lime putty and sand, and, when a fiber product is desired, of fiber and also a measured quantity of a hardening material such, for instance, as Keen's cement will be thoroughly mixed together in the desired proportions to produce mortar or plaster either with or without fiber.

The apparatus for performing the process may be variously constructed and to make the description of the process perfectly clear, a suitable apparatus is illustrated in the drawings and will now be described, it being understood that the invention is not limited to the specific construction of this particular apparatus.

In the apparatus illustrated, there is provided a suitable lime bin 1 adapted to receive crushed or pulverized lime. From the lime bin 1 projects downward a spout 2 discharging into any suitable lime measuring device 3 having a valve $a$.

The lime measuring device 3 is arranged to discharge predetermined quantities of crushed lime through a port 4 into a slaker 5, said slaker in the instance shown comprising a drum 6 and means inside the drum to continuously mix lime and water so thoroughly as to prevent the lime from burning, the water being admitted to the drum through a water supply pipe 7 having a valve $b$ and connected to any suitable source of water supply, not shown. In the drawings, the mixing means in the drum 6 comprise reversely constructed helices or screws 8, 9 of different diameters, said screws being formed of strips of material bent in the form of helices and fastened by arms 10 to a shaft 11 which is journaled at 12 in both ends of the drum. The shaft 11 is driven by suitable means and in the instance shown in the drawings said shaft is provided with a spur gear 13 meshing with a pinion 14 on a jack shaft 15 which is journaled at 16 and which is provided with a spur gear 17 meshing with a pinion 18 on the shaft 19 of a motor 20. When the motor 20 operates, the helical blades 8, 9 move the lime and water in the drum in opposite directions continuously so as to slake the lime without allowing it to become burned.

The slaked lime may discharge from the drum 6 through a discharge pipe 21 having a valve 22, said pipe 21 discharging into a screening device or classifier 23. In the instance shown in the drawings the classifier 23 comprises a lower chamber 24 into which the pipe 21 discharges and also comprises an upper chamber 25, said chambers being separated by a permeable partition in the form of a screen 26.

From the upper chamber 25 discharges a pipe 27 having a valve 28 and from the lower chamber 24 discharges a pipe 29 having a valve 30, the pipe 29 discharging into a grouting mortar or brick mortar putty vat 32.

The pipe 27 from the upper chamber 25 discharges into a second classifier 33 which may be similar to the classifier 23 and which in the instance shown in the drawings comprises a lower chamber 34 and an upper chamber 35 separated from one another by a permeable partition formed by a screen 36. From the upper chamber 35 discharges a pipe 37 that in turn discharges into a finishing coat putty vat 38.

From the lower chamber 34 discharges a pipe 39 which in turn discharges into a base coat putty vat 39', the pipe 39 having a valve 39''.

It is understood that the screens 26, 36 will be of suitable mesh for obtaining any desired quality or fineness of slaked lime in the chambers 25, 35 respectively.

The longitudinal margins of the vats 32, 39' are provided with rails 40 adapted to be engaged by wheels 41 of an agitating, beating, whipping and aerating device indicated in general by the character 42. Said agitating and aerating device 42 may be of any suitable construction such for instance, as that disclosed in my copending application for patent for agitator, filed September 17, 1913, Serial No. 790,320.

Additional water may be supplied to any of the vats 32, 38, 39' through a hose 43 connected to a water supply pipe 44 having a valve 45.

The vat 38 is provided with doors 46 which, when open, allow access to the interior of said vat.

The vats 32, 39' are provided with outlets 47 having suitable valves 48, said outlets 47 discharging into a trough 49 which in turn discharges into a measuring tank 50. Discharging from the measuring tank 50 is a pipe 51 having a valve 52, said pipe 51 discharging into a mixer 53 which, as shown in the drawings, may be in the form of an interrupted screw or paddle conveyer. The shaft 54 of the screw conveyer is operated by suitable means and in the instance shown in the drawings said shaft is provided with a spur gear 55 meshing with a pinion 56 on a jack shaft 57, there being a clutch 58 between said jack shaft and a pulley shaft 59 having a pulley 60 operated by a belt 61 engaging a pulley 62 of a motor 63.

At right angles to the conveyer 53 and discharging thereinto is a mixing device in the form of a screw conveyer 64 having its intake end extending beneath a sand hopper 65. Mounted above the screw conveyer 64 is a hardener measurer 66 having its lower end discharging into said conveyer. The measurer 66 is provided at its outlet end with a helical blade 67 and above said helical blade with an agitating device comprising a shaft 68 having radial fingers 68'. Suitable hardening material such, for instance, as Keen's cement is placed in the upper portion of the measurer 66 so as to be fed in predetermined volume to the conveyer 64. The agitator shaft 68 is provided with a pulley 69 engaged by a belt 70 operated in turn by a pulley 71 which is mounted on a shaft 72 having the helical blade 67, said shaft 72 having a pulley 73 driven by a belt 74 that engages a pulley 75 on a shaft 76. The shaft 76 is driven by a pulley 77 engaged by a belt 78 which in turn engages a pulley 79 on the shaft 59. The shaft 76 is provided with a bevel gear 80 meshing with a bevel gear 81 on the shaft 82 of the screw conveyer 64 so as to operate said screw conveyer. Slides 82' regulate the volume of hardening agent discharging from the measurer 66 into the conveyer 64.

The screw conveyer 53 discharges into a conveyer 83 of the drag or other suitable type which may be driven by any suitable means, not shown, and which discharges into a loading tank 84 having a valve 85 at its outlet end.

Arranged to discharge into the conveyer 53 is a fluffer or fiber feeder indicated in general by the character 86, said fluffer in the instance shown in the drawings being constructed as will now be described. A rotatively mounted cylinder 87 is provided with peripherally arranged rows of picker points 88 and surrounding said cylinder is a casing 89 having rows of picker points 90 on its inner surface projecting between the rows of picker points 88. Discharging downward from the casing 89 is a chute 91 having an inlet opening 92 in one side thereof, said chute having its outlet end discharging into the conveyer 53.

Extending into the inlet opening 92 beneath the rear portion of the cylinder 87 is a draper 93 comprising transversely extending slats 94 provided with projections or points 95, said slats being mounted on endless chains 96 rove around sprocket wheels 97 and said sprocket wheels being mounted on shafts 98, 99 respectively. The slats 94 are preferably narrower at their inner faces than at their outer faces and are provided at the chains 96 with holes 100.

The cylinder 87 and draper 93 are driven by suitable means, the cylinder being driven at relatively high speed and the draper being driven at relatively low speed, and, in the drawings, for this purpose the shaft 98 is provided with a sprocket wheel 101 driven by a sprocket chain 102 engaging a sprocket wheel 103 mounted on and turned by the shaft 99; and said shaft 99 is provided with a sprocket wheel 104 turned by a sprocket chain 105 engaging a sprocket wheel 106 on a jack shaft 107. The jack shaft 107 is provided with a sprocket wheel 108 driven by a sprocket chain 109 engaging a sprocket wheel 110 on the shaft 111 of the cylinder 87. The cylinder shaft 111 is provided with a pulley 112 driven by a belt 113 engaging a pulley 114 of a motor 115. Above the discharge end of the draper 93 and spaced therefrom is a rotatively mounted roller 116.

The jack shaft 107 is provided with a pulley 117 driving a belt 118 which engages a pulley 119 on a shaft 120 of a fiber picker or shredder 121 of any well known or suitable construction, not necessary to describe in detail herein as the construction thereof is well understood.

In practice, the novel process is performed with the apparatus described above as follows: Crushed or pulverized lime is supplied to the hopper 1 and passes into the charger 3. This charger holds a predetermined quantity of the lime which is released by operating the valve $a$. The measured charge of lime passes through the inlet 4 into the slaker drum 6. The valve $b$ is opened long enough to admit a predetermined amount or flow of water to the interior of the drum 6, and, assuming that the motor 20 is in operation, the screw blades 8, 9, will thoroughly mix the lime and water together and will so thoroughly and quickly wet the lime and immerse all of the lime particles in the water that the lime will not evolve an undue amount of heat and therefore will not become burnt. Burnt particles of lime are deleterious to mortar and plaster containing them, for such burnt particles produce hard lumps that will not become thoroughly incorporated in the plaster and mortar thus causing said plaster and mortar to be of more or less coarseness of character and to "pop" when applied in place and not as strong mechanically as when the burning is eliminated.

After the lime has been thoroughly slaked in the slaker 5, the valves 22, 28 will be opened and the liquid slaked lime will discharge into the lower classifier chamber 24. The slaked lime containing only particles fine enough to pass through the mesh of the screen 26 will flow from the lower chamber 24 into the upper chamber 25 from whence it flows by way of the pipe 27 into the lower classifier chamber 34. The liquid slaked lime containing only particles that will pass through the mesh of the screen 36 passes from the chamber 34 into the classifier chamber 35 and thence through the pipe 37 into the finish coat putty vat 38 where it is allowed to remain to age it, thus producing lime putty of an exceedingly fine quality that may be used for the finishing coat in plastering. It is noted that the vat 39 is provided with a cover and this is of advantage in retaining the heat and moisture in the lime putty until it is thoroughly aged. When the lime putty in the vat 38 is sufficiently aged or cured, the doors 46 will be opened and said putty will then be removed through the open end of said vat. Said lime putty is then transported while wet to the place where it is to be used, and said lime putty may be boxed or otherwise prepared for shipment.

The slaked lime containing particles too large to discharge through the screen 26 will be discharged through the pipe 29 by first opening the valve 30, and said slaked lime will be discharged into the base coat putty vat 39' where it will be aged to produce lime putty of not quite such a fine quality as that in the vat 38.

When it is desired to flow slaked lime into the vat 39', the valve 39'' will be opened thus allowing the slaked lime containing particles too large to pass through the screen 36 to discharge from the chamber 34 into said vat where it will be aged to produce brick or grouting lime putty of somewhat coarser grade than that in the vat 32.

It is understood that there may be any desired number of the vats 32, 38 and 39', said number depending on the desired output of the plant and on the capacity of the slaker 5. If the demand for the product of the plant is sufficient the slaker 5 may be run continuously and sufficient number of the vats 32, 38, 39' provided to take care of all the lime discharging from the slaker.

In practical operation there will preferably be a plurality of vats for each grade of product and the slaked lime will be discharged into one of the vats of each grade while the putty in another or other of the vats of each grade is aging. When the lime putty in any one of the vats 32, 39' is sufficiently aged, (and the age depends largely upon the character and quality of the final product desired), the agitator 42 will be operated with its beaters c positioned in whichever vat contains the putty thus aged and if there is not sufficient water standing on top of the lime putty for the purpose, additional water will be discharged into the vat through the hose 43. The agitator 42 will be operated to violently agitate and to beat and whip the putty in the manner that eggs and cream are beaten to lighten them.

This beating and whipping of the putty by operation of the agitator 42 has several advantages. One advantage of the beating and whipping is that the aged lime putty is thinned to a flowing consistency. Another advantage of the beating and whipping is that thereby the putty is made very smooth and of uniform consistency. Another advantage, and one which is of great moment, is that the beating and whipping aerates the putty so that it actually increases the bulk thereof and also permits it to be spread smoother and with greater ease than it otherwise could.

A still further advantage of the beating and aeration of the putty is that the character of said putty seems to be altered sufficiently to cause the finished product to initially "set" or harden quicker than when said beating and aeration is dispensed with, and to cause the produce to become harder, after the initial drying, in less time than is the case with plasters made by other known processes.

From the foregoing it is clear that the time consumed in spreading a square yard of plaster produced by this process is minimized and also that the quantity of lime used per cubic yard of plaster or mortar made by this process is minimized.

When the putty has been thoroughly beaten and aerated, the valve 48 of the appropriate vat will be opened and the aerated lime putty will freely flow from said vat through the trough 49 into the measuring tank 50. When the measuring tank 50 is filled, said valve 48 will be closed. Assuming that the motor 63 is in operation and that the hopper 65 is provided with sand, said sand will discharge into the conveyer 64 and will be carried by said conveyer beneath the hardener measurer 66; and, assuming that a hardening substance such, for instance, as Keen's cement is supplied to the measurer 66, said Keen's cement will discharge in fixed proportion to the volume of sand into the conveyer 64 and will be mixed uniformly with the sand by said conveyer. The mixture of sand and Keen's cement will be carried by the conveyer 64 into the conveyer 53. The valve 52 will then be opened to discharge aerated lime putty from the measuring tank 50 into the conveyer 53 in fixed proportion to the sand and cement volumes. The conveyer 53 thoroughly and uniformly mixes the lime putty with the sand and Keen's cement in said conveyer and said conveyer discharges the mixture into the conveyer 83 which thereupon elevates and conveys the plaster or mortar to the hopper 84 from whence it is discharged directly into a truck by opening the valve 85. The plain plaster or mortar thus produced has no fiber in it.

When it is desired to add fiber to the plain plaster or mortar to produce a fiber plaster or mortar, assuming that the motor 115 has been started in operation, an attendant will feed fragments of old rope or other fibrous material into the shredder 120 in a manner well understood and the fiber thus shredded will be placed evenly on the draper 93. As the draper advances, it carries the shredded fiber in a sheet beneath the roller 116 which functions to press the fiber down on the projections 95 and to hold the sheet of fiber as it moves toward the cylinder 87. Said cylinder revolving at a high rate of speed picks and separates the fibers from the sheet and from one another and produces sufficient current of air to blow the fibers in a finely separated state downward through the chute 91 into the conveyer 53 in volume of definite proportion relative to the volume of plaster or mortar mixture passing through the conveyer 53 which then operates to mix said fiber with the sand, Keen's cement and aerated lime putty in said conveyer.

The fiber plaster or mortar thus produced is discharged into the hopper 84 the same as previously described for the plain plaster or mortar and is also loaded into the truck in the same manner.

But one conveyer 53 is shown in the drawings, but it is understood that in practice it may be deemed expedient to provide a plurality of said conveyers to increase the capacity of the plant.

It is readily understood that Keen's cement or other hardening agent need not necessarily be fed to the sand but that said cement or agent could as readily be fed to the putty or to the mixture of sand and putty in the same way that it is described as being fed to the sand; and also it is clear that though I have shown and described the fiber as being fed to the mixture of sand, putty and cement said fiber could as readily be fed to the cold putty or to the sand or to the mixture of sand and cement; and such slight variations as these are within the spirit and scope of the invention as defined in the appended claims.

I claim:

1. The process of making mortar and plaster having a lime base, which process comprises aging slaked lime to form lime putty, adding water to the lime putty to thin it, beating and whipping the thinned lime putty to aerate it, and then mixing sand with the aerated thinned lime putty.

2. The process of making mortar and plaster having a lime base, which process comprises aging slaked lime to form lime putty, adding water to the lime putty to thin it, beating and whipping the thinned lime putty to aerate it, mixing sand with the aerated lime putty, and blowing finely separated strands of fiber into the mixture of sand and lime putty.

3. The process of making mortar and plaster having a lime base, which process comprises aging slaked lime to form lime putty, adding water to the lime putty to thin it, beating and whipping the thinned lime putty to aerate it, and mixing a hardener and sand with the aerated thinned lime putty.

4. The process of making mortar and plaster having a lime base, which process comprises aging slaked lime to form lime putty, adding water to the lime putty to thin it, beating and whipping the thinned lime putty to aerate it, mixing a hardener and sand with the aerated thinned lime putty, and blowing finely separated strands of fiber into the resulting mixture.

5. The process of making mortar and plaster having a lime base, which process comprises aging slaked lime to form lime putty, adding water to the lime putty to thin it, beating and whipping the thinned lime putty to aerate it, mixing sand with the aerated thinned putty, feeding fibrous material in a continuous sheet at a determined rate of speed, and picking strands of the fiber from the advancing sheet and into the mixture of sand and putty.

6. The process of making mortar and plaster having a lime base, which process comprises slaking lime, classifying the slaked lime according to the size of the particles therein, aging the different classifications of slaked lime to form different grades of lime putty, adding water to one of the grades of putty to thin said grade, violently agitating the thinned grade of lime putty to aerate it, and mixing sand with the aerated lime putty to produce mortar.

7. The process of making mortar and plaster having a lime base, which process comprises aging lime putty, thinning said putty with water to flowing consistency, violently agitating the thinned putty, causing sand to move in a continuous stream, and causing the thinned putty while being thus agitated to flow at a determined rate into the moving stream of sand.

8. The process of making mortar and plaster having a lime base, which process comprises aging lime putty, thinning said putty with water to flowing consistency, violently agitating the thinned putty, causing sand to move in a continuous stream, feeding a hardening agent at a determined rate into the moving stream of sand, and causing the thinned putty to flow at a determined rate into the moving stream of said agent and sand.

9. The process of making mortar and plaster having a lime base, which process comprises aging lime putty, adding water to the aged lime putty, violently agitating the putty after the water is added to reduce the putty to flowing consistency, causing sand to move in a continuous stream, discharging the thinned putty at a determined rate of flow into the moving stream of sand, and discharging separated strands of fiber at a determined rate of flow into the moving mixture of sand and putty.

10. The process of making mortar and plaster having a lime base, which process comprises aging lime putty, adding water to the aged lime putty, violently agitating the putty after the water is added to reduce the putty to flowing consistency, causing sand to move in a continuous stream, feeding a hardening agent at a determined rate into the moving stream of sand, discharging the thinned putty at a determined rate of flow into the moving stream of sand and said agent, and discharging separated strands of fiber at a determined rate of flow into the moving mixture of sand, said agent and putty.

Signed at Los Angeles, California, this 10th day of October, 1916.

WILLIAM C. HAY.

Witnesses:
GEORGE H. HILES,
A. F. SCHMIDTBAUER.

Copies of this patent may be obtained for five cents each, by addressing the "Commissioner of Patents. Washington, D. C."